Jan. 22, 1957  M. L. BENJAMIN ET AL  2,778,651
CHUCK STOPS FOR DRILLS
Filed March 26, 1954
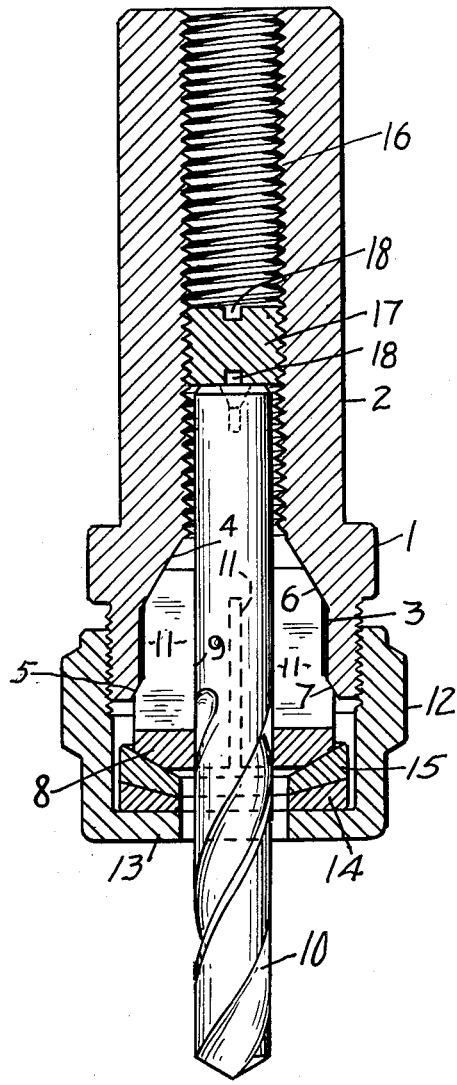
INVENTORS
MILTON L. BENJAMIN,
STANLEY S. BENJAMIN
BY Oberlin & Limbach
ATTORNEYS.

United States Patent Office 2,778,651
Patented Jan. 22, 1957

2,778,651
CHUCK STOPS FOR DRILLS

Milton L. Benjamin and Stanley S. Benjamin, Cleveland, Ohio, assignors to Erickson Tool Company, a corporation of Ohio Application March 26, 1954, Serial No. 418,977

3 Claims. (Cl. 279—47)

The present invention relates generally as indicated to a chuck for drills and the like, and more particularly to a chuck for tools such as drills, reamers, etc. which are subject to axial thrust load and torque when simultaneously rotated and fed axially relative to the workpiece, operated upon thereby.

In the case of drilling, for example, the recommended feed for a 1½" diameter drill is usually about .015" per revolution, and at a drill speed of 150 R. P. M., this will produce a torque on the drill of about 170 lbs./ft., and an axial thrust of about 4000 lbs., the latter figure being for a 1½" diameter drill operating on tool steel at the feed and speed given. As is apparent, it has been quite a problem to grasp large-size, straight-shank drills in a chuck to hold the same accurately centered while yet resisting rotation thereof under high torque conditions. One prior practice is to use long wrenches on the threaded nose pieces of the drill chucks, and even then rotary slippage sometimes occurs; and, of course, once such rotary slippage starts, it cannot be stopped, except by either arresting or reducing the feed, because the sliding friction then is much less than the static friction. It is also desirable in drill chucks and the like to provide an adjustable stop against which the shank end of the tool abuts, but in the conventional form of drill chuck with an adjusting screw, the rotary slippage is apt to cause a change in the adjustment of the adjusting screw owing to the thrust of the tool against the end of the screw.

It is a primary object of this invention to provide a chuck of the character indicated which has but a single member therein which operates in a dual capacity, viz. (1) as an adjustable stop to not only axially position the tool in the chuck, but to prevent axial slippage thereof in the chuck; and (2) as a drive member to preclude rotary slippage of the tool in its supporting member.

Another object of this invention is to provide a chuck of the character indicated in which substantially positive driving of a straight shank tool is effected without requiring any special formations such as flats, tangs, grooves or the like, non-rotatably engaged with complementary elements of the chuck.

Another object of this invention is to provide a chuck of a form such that the main function of the contractible collet associated therewith need only be to hold the tool in a position coaxial with the tool-supporting member while the functions of precluding relative rotation and relative axial sliding of the tool and the supporting member are left to the aforesaid adjustable stop member.

Another object of this invention is to provide a chuck in which thrust loads of the shank end of the tool are utilized to momentarily increase the rate of feeding of the tool into the workpiece whenever the tool rotates with respect to its supporting member to thereby effect an abrupt increase in the thrust of the tool against the stop member and a consequent increase in the torsional resistance to continued relative rotation between the tool and its supporting member.

Another object of this invention is to provide a chuck having means associated therewith for automatically maintaining a predetermined minimum torque resistance between the tool and its supporting member in response to relative rotation between them.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

In said annexed drawing, the single figure is a central longitudinal cross-section view of one form of the chuck which constitutes the present invention.

Referring now in detail to the drawing, there is shown therein a typical tool-supporting member 1 which includes at its one end a shank 2 which is adapted to be non-rotatably and axially fixedly mounted in the spindle of a drill press or like machine. As is apparent, the style of the supporting member 1 may be varied, for example the shank 2 may be tapered and may also be provided with a tang at its upper end.

The other end of member 1 is formed with a bore 3 including axially spaced parallel conical bearing surfaces 4 and 5 which are complementary with like bearing surfaces 6 and 7 formed on the outer surface of the contractible collet 8. Said collet 8 has a central bore 9 therethrough through which the shank or body portion of a tool 10 (herein, a drill) extends. In order to render said collet 8 readily contractible to grip the shank of said drill 10, it is intersected by a plurality of radial slots 11, alternate ones of which extend from one end of said collet to points close to the other end thereof. Thus, axial movement of the collet 8 upwardly with respect to the member 1 will cause radial contraction of said collet into frictional gripping engagement with the shank of said drill 10. The means for drawing said collet 8 into said supporting member 1 is here shown as consisting of a nose piece 12 which is threaded onto said member 1 and which is formed with an inturned flange 13. Between such flange 13 and the lower end of collet 8 is interposed a nose ring 14 and a collet ring 15 effective to reduce the tendency of turning of said collet 8 when said nose piece 12 is tightened.

The above-described means for contracting said collet 8 is disclosed in Milton L. Benjamin et al. Patent No. 2,358,300, dated September 19, 1944, and of course such means may optionally be of any of the forms in Milton L. Benjamin et al. Patent No. 2,358,299, also dated September 19, 1944, and Milton L. Benjamin Patent No. 2,228,685, dated January 14, 1941. As a matter of fact, insofar as the broader aspects of the invention are concerned, said collet 8 and the contracting means therefor may be of any well-known form. However, a collet structure such as disclosed in the aforesaid patents is preferred because each is designed to grip the tool so that its longitudinal axis coincides with that of the supporting member 1, whereby weaving of the tool as caused by eccentricity or misalignment of the axis of the tool with respect to the axis of the supporting member is eliminated. Still another ideally suited collet structure is one in which the lower end face of the collet lies in a plane perpendicular to the axis thereof, whereby contraction will be effected solely by the complementary bearing surfaces 4, 6 and 5, 7, and thus a more nearly parallel contraction of said collet is assured.

Upwardly beyond the conical bearing surface 4, said supporting member 1 is formed with a lefthand internally threaded bore 16 in which an adjusting screw or adjustable stop member 17 is threadedly engaged, said adjustable stop member 17 preferably being formed with screw driver slots 18 or the like at both ends so as to be readily accessible for adjustment. Said stop member 17, as will be presently seen, operates both as a stop to properly position the drill 10 or other tool axially of the support member 1 and to take up axial thrust on said drill 10 and further as a means for substantially positively driving said drill 10 (without being keyed thereto) even though the nose piece 12 is only tightened with light wrench pressure.

Before discussing the novel operational features flowing from the chuck described above, some of the shortcomings of prior art chucks will first be briefly referred to. Following is a list of typical prior art structures together with a statement of the manner in which each one operates when rotary slippage occurs between the tool and its supporting member:

A. *No axial stop for the tool in its supporting member*

In this form of chuck, continued feeding of the tool supporting member with respect to the work after rotary slippage of the tool commences, simply causes the tool to axially slide in the supporting member with the result that no further cutting of the work is possible, except at a much reduced speed and feed owing to the sliding coefficient of friction being much less than the static coefficient of friction.

B. *Axial stop for tool in its supporting member*

In this form of chuck, continued feeding of the tool supporting member with respect to the work after rotary slippage of the tool commences, either causes breakage of the tool by the excess thrust load thereon, or overloading of and damage to the power feeding means. In such case, because the tool and the work are not rotating with respect to each other, any attempt to continue the feeding of the tool into the work is merely an attempt to push the tool through the work without cutting action. In other words, the tool, in effect, becomes a punch.

C. *Adjustable axial stop non-rotatably engaging the tool and having righthand threaded engagement with the tool supporting member*

In this form of chuck, rotary slippage of the tool effects relative rotation between the stop member and the tool supporting member in a direction permitting axial movement of the tool in said member. In such an arrangement, the adjustable stop functions as such, only when the tool and the tool supporting member are rotating in unison. Such rotation of the adjustable stop would also occur, even without the non-rotatable engagement with the tool, through the frictional engagement of the end of the body of the tool with the end of the adjustable stop. In other words, when the tool and its supporting member rotate with respect to each other, axial slippage of the tool occurs just as in paragraph A above wherein no stop member at all is provided.

In direct contrast to the above-described prior art structures, the present chuck is formed so that rotary slippage between the tool 10 and its supporting member 1 is operative through the adjustable stop member 17 to provide additional torque resistance to supplement that obtained through said collet 8 whereby the total torque resistance is at all times at least a predetermined minimum, sufficient to continue rotation of the tool and its supporting member in unison while continually feeding the tool into the work. In this way, the adjustable stop member 17 operates as a substantially positive drive means to preclude such rotary slippage between the tool and its supporting member, while yet not requiring any special formation on the tool end for positive non-rotary engagement thereof with said adjustable stop member 17.

To exemplify the novel manner of operation of the present chuck, let it be assumed that a drill is being fed at a rate of $f$ inches per revolution and a peripheral speed of $s$ ft./min. as determined primarily by the material which is to be drilled and also the cutting fluid which is used. With such pre-selected feed and speed, predetermined torque and axial thrust loads will be imposed on the drill. If the nose piece 12 is so tightened that the torsional grip between member 1 and drill 10 equals or exceeds such predetermined torque, no rotary slippage problem is encountered, and in such event the adjustable stop member 17 simply operates as a positive stop to preclude axial slippage of said drill 10. On the other hand, should the nose piece 12 be tightened only by light wrench pressure whereby the resistance to relative rotation of said drill 10 and its supporting member 1 is less than this torque imparted to the drill by the feed $f$ and speed $s$, the stop member 17 will then operate as a substantially positive drive means to preclude relative rotation between said drill 10 and its supporting member, and in this way permit continued feeding of the drill into the work.

As soon as the drill 10 commences to rotate with respect to its supporting member 1 during the feeding of said drill 10 into the work, such relative rotation will, through the lefthand threads 16 and the frictional engagement between the end of said stop member 17 and the end of said drill 10, rotate said stop member 17 in a direction such that it will move axially downwardly as viewed in the drawing. The immediate effect of such relative rotation and downward movement of said stop member 17 is to abruptly increase the rate of feed, which feed prior to relative rotation was $f$ inches per revolution and which feed subsequent to such relative rotation may be as much as $f''$ plus the lead of the threads 16, such maximum feed occurring when the drill ceases to rotate and the axial feeding thereof is continued. The much increased axial thrust then causes a proportionate increase in the torque resistance (at the threads 16) to a further rotation of said stop member 17, whereupon the increased torque resistance, through said stop member 17, supplements that between said collet 8 and drill 10 or between said collet 8 and said supporting member 1. The total torque resistance will then be sufficient to effect continued feeding of the drill 10 at the rate $f$ without rotary slippage between said drill 10 and its supporting member 1.

In analyzing the action of stop member 17 from a somewhat different standpoint, it will be seen that if the feed $f$ and the torque required to feed said drill 10 are represented by parallel horizontal lines and the torque resistance at the collet 8 be a horizontal line in between the aforesaid parallel lines, the effect of relative rotation of said drill and its supporting member is to add to the torque resistance line an amount equal to the difference between the required torque line and the torque resistance line. Such balancing of the total torque resistance (that at said collet 8 plus that obtained through stop member 17) to secure the required torque is maintained without appreciable change in the axial position of stop member 17. Actually, when the drill 10 is operated under such conditions, there is more or less a constant tendency for the drill and supporting member to rotate with respect to one another to thus keep the adjustable stop member 17 loaded sufficiently to make up the deficiency in the torque resistance at the collet 8.

It is to be understood that, although the present invention has been described with respect to the combination of a chuck and a drill, other similar tools such as a reamer or the like may be substituted for said drill, the principal requirement being that the tool, whatever its character, be operative to perform its operation on a workpiece by simultaneously rotating and axially feeding it relative to the workpiece. Moreover, inasmuch as the rotation and axial movements of the tool and workpiece are relative, it will be obvious that the supporting member and the tool held thereby may be rotated and the workpiece may be fed axially theretoward; or else the supporting member and tool may be fixed and the workpiece may be rotated and fed axially theretoward.

Other modes of applying the principle of the invention may be employed, change being made as regards the details described, provided the features stated in any of the following claims, or the equivalent of such, be employed.

We therefore particularly point out and distinctly claim as our invention:

1. In combination, a tool which is subject to torsion and axial thrust loads when rotated and axially fed into engagement with a workpiece, a chuck for gripping said tool, and an adjustable stop member threadedly engaged with said chuck and having an end surface against which said tool abuts, the interengaged threads of said chuck and stop member being substantially coaxial with said tool and being of hand opposite to the torque and thrust loads imposed on said tool when rotated and axially fed as aforesaid whereby, in the event of relative rotary slippage between said tool and chuck under the influence of torque load on said tool, and upon continued axial feed of said chuck and tool relative to a workpiece, the frictional engagement between the abutting surfaces of said stop member and tool tends to induce a relative rotation of said stop member and chuck in the direction of axial feed to thus increase thrust load between the abutting surfaces of said stop member and tool and thereby build up a torque resistance between such abutting surfaces to arrest rotary slippage between said chuck and tool.

2. In combination, a righthand drill having a cylindrical shank, and a chuck for gripping said shank, said chuck having a lefthand threaded stop member threadedly engaged therein against which said drill abuts, said stop member being effective, upon rotary slippage of said drill in said chuck and upon continued axial feed of said drill, and consequent increased axial thrust of said drill against said stop member, to build up a torque resistance between the abutting surfaces of said stop member and drill sufficient to arrest such rotary slippage.

3. A chuck for a righthand drill or like tool, comprising a body, tool holding means in said body, and a lefthand threaded stop member having threaded engagement in said body and adapted to be abutted by a tool held by said means whereby rotary slippage of such tool and continued axial feed thereof will be effective to tend to rotate said stop member in the direction of axial feed to thus increase the thrust load of the tool against the stop member and thereby build up a torque resistance between the abutting surfaces of said stop member and tool to arrest such rotary slippage.

References Cited in the file of this patent
UNITED STATES PATENTS 1,953,830    Park ------------------ Apr. 3, 1934